(No Model.)
C. E. BALL.
DYNAMO ELECTRIC MACHINE.
No. 285,548. Patented Sept. 25, 1883.
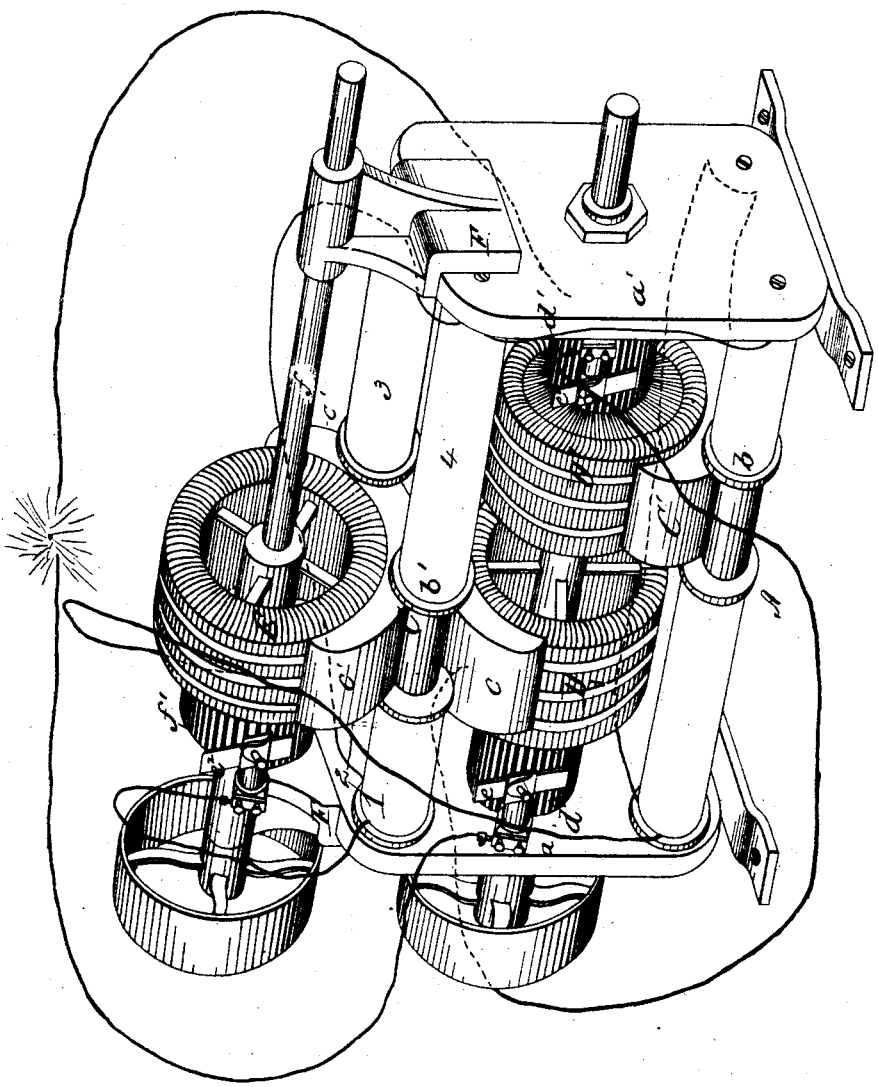
WITNESSES:
Wm. H. Powell.
G. Connolly.
Chas. E. Ball
INVENTOR
by Connolly Bros
ATTORNEYS

UNITED STATES PATENT OFFICE.

CHARLES E. BALL, OF PHILADELPHIA, PENNSYLVANIA.

DYNAMO-ELECTRIC MACHINE.

SPECIFICATION forming part of Letters Patent No. 285,548, dated September 25, 1883.

Application filed July 21, 1883. (No model.)

*To all whom it may concern:*

Be it known that I, CHARLES E. BALL, a citizen of the United States, residing at Philadelphia, in the county of Philadelphia and State of Pennsylvania, have invented certain new and useful Improvements in Dynamo-Electric Machines; and I do hereby declare the following to be a full, clear, and exact description of the invention, reference being had to the accompanying drawing, which forms a part of this specification, in which the figure is a perspective of a dynamo-electric machine embodying my improvements.

My invention has for its object to provide a dynamo-electric machine with an exciter forming an integral part of the machine itself, said exciter being energized from or by the magnet or one of the poles of the magnets of the machine to which it pertains, thereby avoiding the necessity of having the exciter a separate instrumentality energized from an independent source, as heretofore.

Referring to the accompanying drawing, A indicates a dynamo-electric machine comprising the end pieces, $a$ $a'$, bars $b$ $b'$, pole-pieces C C', armatures D D', commutators $d$ $d'$, and brushes $e$ $e'$, constructed conformably to Letters Patent heretofore granted me. My present improvements thereon comprise the following additions: The pole-piece C is made double, having the horns $c$ $c$, which partially encircle the armature D, and having also on its opposite side horns $c'$ $c'$, which partially encircle or oppose an armature, E, mounted on a shaft, $f$, which is sustained in brackets F F, cast with or affixed to the end pieces or heads, $a$ $a'$. Said armature has a commutator, $f'$, and the usual brushes, one of which is shown at $e^2$, the other, which is not visible in the drawing, being on the opposite side.

The connections and circuits are as indicated, and may be traced substantially as follows: From brush $e^2$ to helix 1; thence to helices 2, 3, and 4, successively, thence to the four lower field-helices, and back therefrom to the brush opposite brush $e^2$, and through armature to starting-point. In other words, this circuit includes the armature E and the field-magnet coils of the machine, said armature being thus the exciter of or for said field. The main working-circuit of the machine includes merely the two armatures D D' and the external circuit.

The circuit, which includes the exciter-armature E, may, if desired, be extended to and include a light or other device for utilizing electric energy; but it is primarily intended to embrace only the armature and field.

Inasmuch as there is always surplus magnetism in the bars of the machine A, I am enabled to utilize such surplus by the provision of the double pole-piece and exciter armature. By including the field-magnet coils in the circuit with this armature, the latter operates as an exciter to the former. The currents generated in the main armatures D D' can thus be wholly employed for supporting the external circuit, said currents being quantity-currents, such as are desirable and necessary for incandescent lighting. I am therefore enabled, by the means described, to produce a very simple and efficient quantity-generator for incandescent lighting, without the expense of a separate exciter, such as has been heretofore required in like cases or for similar purposes.

What I claim as my invention is—

1. The combination, with the field-magnets of a dynamo-electric machine, of an exciter comprising an armature in circuit with said field-magnets, and located externally in opposition to a pole-piece sustained upon the magnet-bars of such field-magnets.

2. The combination, with a dynamo-electric machine having a double pole-piece—*i. e.*, one with inwardly and outwardly turned horns—of an armature mounted upon an externally-located shaft, said armature being adapted and designed to act as an exciter for said machine, substantially as shown and described.

3. The combination, with machine A, comprising ends and heads $a$ $a'$ and magnet-bars $b$ $b'$, of an externally-extended pole-piece, and an armature E, located in opposition to said pole-piece, and mounted on a shaft sustained in brackets or supports F F, formed on or attached to the said heads, substantially as shown and described.

In testimony that I claim the foregoing I have hereunto set my hand this 16th day of July, A. D. 1883.

CHAS. E. BALL.

Witnesses:
A. A. CONNOLLY,
M. D. CONNOLLY.